(12) United States Patent
Diefenbaugh (10) Patent No.: US 7,849,251 B2
(45) Date of Patent: Dec. 7, 2010

(54) HARDWARE ASSISTED ENDPOINT IDLENESS DETECTION FOR USB HOST CONTROLLERS

(75) Inventor: Paul Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 11/999,925

(22) Filed: Dec. 7, 2007

(65) Prior Publication Data

US 2009/0150582 A1    Jun. 11, 2009

(51) Int. Cl.
G06F 13/20    (2006.01)
(52) U.S. Cl. .......................................... 710/313; 710/46
(58) Field of Classification Search ................. 710/110, 710/306, 310–315, 260, 46–48
See application file for complete search history.

(56) References Cited

U.S. PATENT DOCUMENTS

| | | | |
|---|---|---|---|
| 6,085,325 A * | 7/2000 | Jackson et al. .............. 713/300 |
| 6,119,194 A * | 9/2000 | Miranda et al. ............. 710/306 |
| 6,311,294 B1 * | 10/2001 | Larky et al. .................... 714/44 |
| 6,721,815 B1 * | 4/2004 | Leete .............................. 710/6 |
| 6,781,905 B2 * | 8/2004 | Fujiwara ...................... 365/207 |
| 6,898,751 B2 * | 5/2005 | Aikawa et al. .............. 714/748 |
| 6,918,000 B2 * | 7/2005 | Zolnowsky .................. 710/313 |
| 7,007,110 B2 * | 2/2006 | Howard et al. ................ 710/33 |
| 7,281,074 B2 * | 10/2007 | Diefenbaugh et al. ........ 710/260 |
| 7,409,485 B1 * | 8/2008 | Sartin .......................... 710/305 |
| 7,490,255 B2 * | 2/2009 | Diefenbaugh et al. ........ 713/320 |
| 7,555,578 B2 * | 6/2009 | Lim et al. ...................... 710/52 |
| 2005/0044286 A1 * | 2/2005 | Lim et al. ...................... 710/15 |
| 2009/0077277 A1 * | 3/2009 | Vidal et al. .................... 710/46 |

* cited by examiner

Primary Examiner—Raymond N Phan
(74) Attorney, Agent, or Firm—Caven & Aghevli LLC (57) ABSTRACT

In some embodiments, an electronic apparatus comprises at least one memory module, and a universal serial bus (USB) host controller coupled to the memory, wherein the USB host controller implements hardware assisted idleness endpoint detection.

12 Claims, 4 Drawing Sheets

HARDWARE ASSISTED ENDPOINT IDLENESS DETECTION FOR USB HOST CONTROLLERS

RELATED APPLICATIONS

This application is related to the following, commonly assigned U.S. patent applications: Ser. No. 11/428,266 by Diefenbaugh et al., entitled "A Power Efficient Flow Control Model for USB Asynchronous Transfers," filed Jun. 30, 2006, Ser. No. 11/171,833, by Diefenbaugh et al., entitled "Method and Apparatus to Quiesce USB Activities Using Interrupt Descriptor Caching and Asynchronous Notifications," filed Jun. 29, 2005, and Ser. No. 11/170,771, by Howard, entitled "Enhancements to Universal Serial Bus (USB) Suspend and Resume Operations," filed Jun. 29, 2005.

BACKGROUND

Electronic devices such as computers are often interconnected to peripheral devices to communicate data. Examples of peripheral devices include a keyboard, a mouse, a memory device, and a printer. A Universal Serial Bus (USB) is often used to communicate data between a host processor and peripheral devices. A USB host controller manages the transfer of data over a USB bus to downstream USB devices.

Power management of the interconnected devices is becoming more of a concern as computers implement mobile system platforms where the computers and devices are battery powered. While a USB is quite effective at moving large amounts of data very quickly, it can be relatively inefficient with respect to power consumption. One reason for this inefficiency is the USB host controller's reliance on main memory for virtually all of its operational state and the distribution of the operational state across comparatively small non-contiguous data structures in the main memory, which requires the USB host controller to frequently access data transfer schedule structures in the main memory. Another reason is the inability for USB devices to asynchronously notify the USB host controller upon meaningful events, such as when the device is ready to transfer data.

BRIEF DESCRIPTION OF THE DRAWINGS

The detailed description is described with reference to the accompanying figures, in which.

DETAILED DESCRIPTION

Described herein are exemplary systems and methods for implementing hardware assisted endpoint idleness detection in USB host controllers which, in some embodiments, may be implemented in an electronic device such as, e.g., a computer system. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
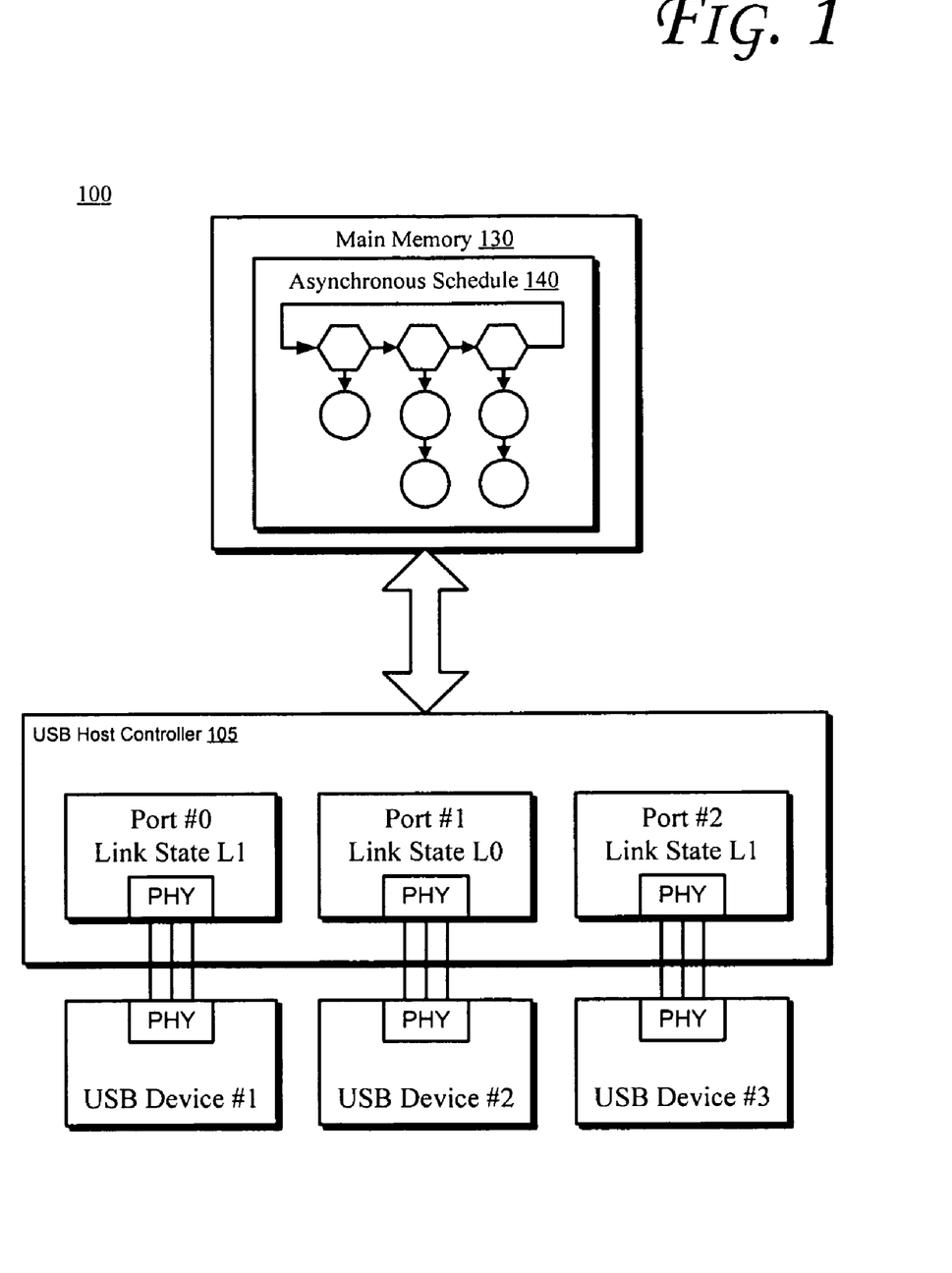
FIG. 1 is a block diagram of portions of an apparatus that supports a Universal Serial Bus (USB), according to some embodiments.

FIG. 1 is a block diagram of portions of a device 100 that supports a USB. The device 100 includes a USB host controller 105 and one or more USB ports 110. A USB port 110 includes a physical layer 115 (PHY) for communicating data over a link 120 between the USB port 110 and a USB device 125. Four transfer types are defined in USB protocol specification revision 2.0 (hereinafter "USB 2.0 protocol"): interrupt, isochronous, bulk, and control transfers. For the Enhanced Host Controller Interface (EHCI) implementation of a USB host controller 105, the interrupt and isochronous transfers are serviced according to a periodic schedule (not shown) stored in main memory 130. Bulk and control transfers are serviced according to an asynchronous schedule that is also stored in main memory 130. Although the examples are described in view of the EHCI implementation of a USB host controller 105, the systems and methods described can be applied to other USB host controller 105 implementations such as an open host controller interface (OHCI), a universal host controller interface (UCHI), or to other implementations of a serial bus controller, although the details of the implementations will differ slightly.

Bulk transfers are designed to support devices that need to communicate relatively large amounts of data at variable times, such as a memory or a networking device, for example. A bulk transfer can use any available bandwidth, and data is guaranteed to be delivered, but with no guarantee of bandwidth or latency. Control transfers are generally used for configuring devices, such as after a USB device 125 signals it has been connected and reset, for example. The USB host controller 105 generally services the asynchronous transfers when they occur using the channel bandwidth remaining after the periodic transfers.

The asynchronous schedule 140 may be a simple circular linked list of schedule work items that provides a round-robin service opportunity for all asynchronous transfers. The schedule work items include one or more queue heads 145. Each queue head 145 represents a single bulk or control transfer corresponding to an endpoint. An endpoint is a logical entity residing on a USB device 125 requiring service. In some embodiments, a queue head 145 includes zero or more transfer descriptors 150 associated with it, using another linked list structure. Each transfer descriptor 150 represents a discrete amount of work (i.e., data to either transmit to, or receive from, a specific endpoint using one or more transactions) to occur over USB link 120.

The USB host controller 105 traverses the circular linked list of queue heads 145 and executes a small number (typically one) of transactions associated with a queue head 145. The USB host controller 105 will continue traversal of the circular linked list until: i) no transactions were executed during the last traversal of the circular linked list; ii) the start of a new micro-frame occurs which switches processing by the USB host controller 105 over to the periodic transfer schedule; or iii) software disables the asynchronous schedule 140. Typically, USB host controllers 105 consult the asynchronous schedule 140 in main memory 130 to discover and execute transactions. To optimize data throughput, the asynchronous schedule 140 is parsed frequently (e.g., every ten to twenty microseconds (μsec)).

As the circular link list is traversed, transactions are executed on the bus and an endpoint that is not currently ready to consume data will return a not ready (NAK) response for Bulk-IN and PING transactions or a NYET signal for a Bulk-OUT transaction. The schedule architecture and traversal rules described above lead to frequent transactions to an endpoint with commensurate NAK (or NYET) responses. The endpoint will be repeatedly polled at the rate of once per list traversal until it delivers all of its data even though the endpoint may NAK transactions for long periods of time.

Structures in the asynchronous schedule 140 often persist for long periods of time relative to the host controller's internal operation. For example, a driver for a USB device 125 may create a pair of Bulk-IN and Bulk-OUT queue heads 145 and transfer descriptors 150 when the device adapter is enabled (e.g., when a network cable is plugged-in, or the adapter is associated with a wireless access point such as a Bluetooth adapter and is enabled). Transfer descriptors 150 are typically modified (e.g., by retiring completed transfer descriptors 150 or by adding new transfer descriptors 150) only when data is actively flowing, and the host controller may execute transactions from each transfer descriptor 150 many thousands of times before it is successfully completed.

The result of servicing the asynchronous schedule 140 is the frequent accessing of main memory 130 by the USB host controller 105 to schedule data structures. This is true even if pauses are injected during intervals such as when all queue heads 145 are inactive or during each Start of Frame (SOF). In some embodiments, the polling rate of the USB host controller 105 is quite aggressive (e.g., <10 □s) in order to accommodate USB devices 125 that require maximum responsiveness and throughput.

The USB 2.0 protocol is effective in moving large amounts of data. The USB 2.0 protocol provides a simple flow control mechanism where a USB device 125 simply responds with a NAK response to a transaction and leaves the decision about when to retry to the USB host controller 105. A USB host controller 105 typically attempts to resume the data stream by issuing another request to move data at the earliest opportunity (e.g., the very next transaction on the bus). Bulk transfers generally use short bursts over an extended period of time to transfer large quantities of data. Most USB networking and mass storage devices rely entirely on the bulk transfer type to move data.

However, mismatches occur between the available bandwidth of the USB host controller 105 and the USB device 125. The USB 2.0 protocol does not provide a mechanism for USB devices 125 to asynchronously notify a USB host controller 105 that data is ready for transfer or space is available to accept data. This results in long periods where USB host controller 105 repeatedly polls USB devices 125 to determine when they are ready to either produce (e.g., Bulk-IN) or consume (e.g., Bulk-OUT) data. This polling results in multiple accesses to the main memory 130 by the USB host controller 105 for such tasks as reading from the asynchronous schedule 140 and to writing back the status of the transfer. These periods of high transaction activity that have little or no real data being transferred can lead to inefficiencies in power consumption by the USB host controller 105.

Frequent polling improves the responsiveness of the system and reduces the amount of buffering (data storage) required on the device. However, a USB device with a low data transfer rate or having an indeterminate time of data arrival (such as a networking device) may respond to multiple polling requests with a not ready or NAK response until it is ready to move data. These cycles of polling requests and not ready responses result in inefficiencies in the platform with respect to power consumption.

This constant background activity related to the frequent polling of USB devices 125 and the frequent access to main memory 130 by USB host controllers 105 not only causes more power to be consumed by the USB host controller 105, USB ports 110, and USB devices 125, but often defeats other power reduction schemes implemented in the host computer. Although this reliance on main memory 130 is the cause of many power management issues, it is so fundamental to the architecture that any major change to the role of the USB host controller 105 or main memory 130 would negatively impact the existing software infrastructure.

By providing a more power efficient USB bus, the battery life of mobile devices such as mobile personal computers (PCs) can be improved. However, it is desirable that any change to the implementation be compatible with existing USB protocols. In addition, any solution to reduce the amount of background activity should preserve the responsiveness and throughput of a serial bus when needed, but operate much more efficiently when data is not actively moving on the bus.

Figure 2:
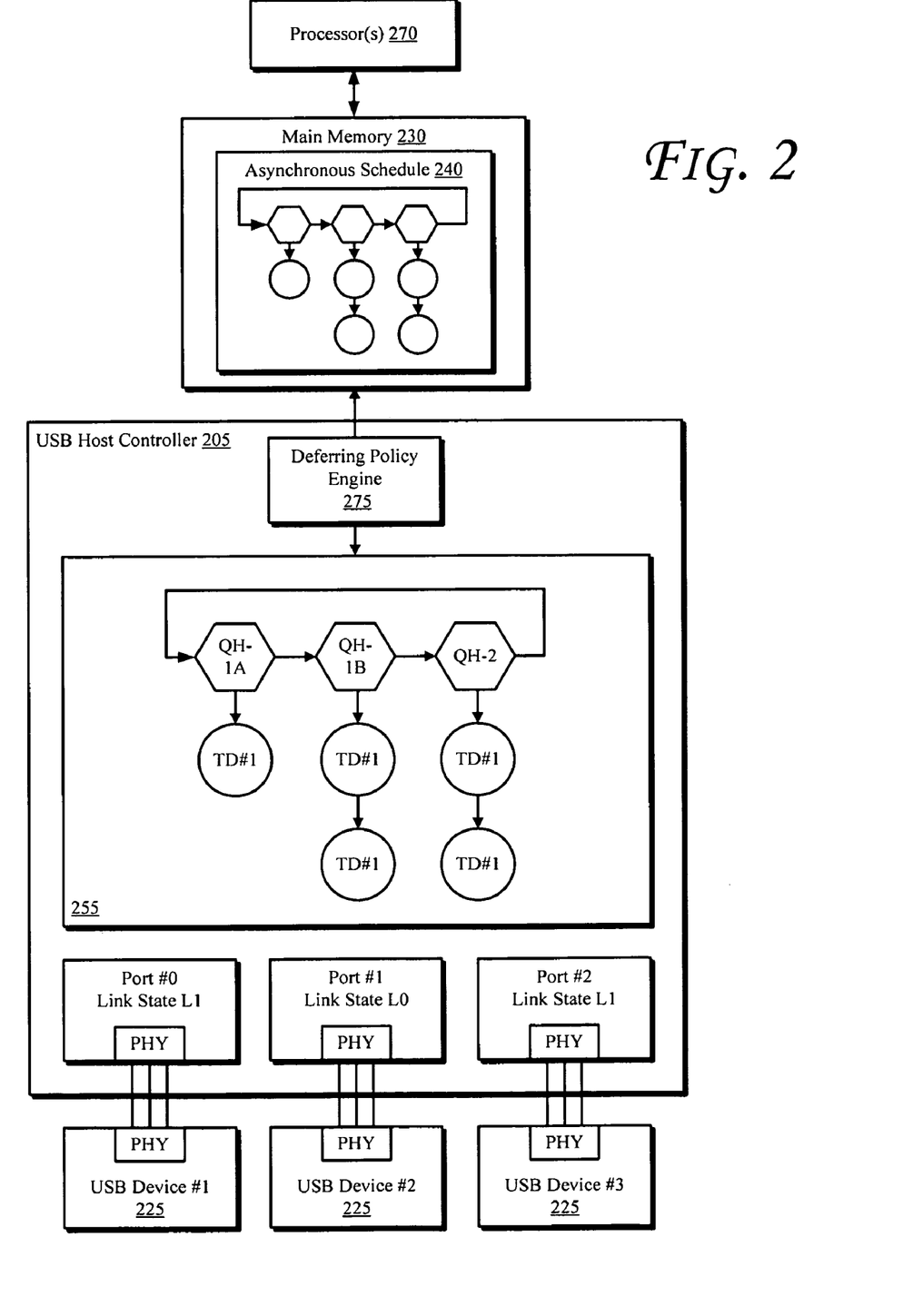
FIG. 2 is a schematic illustration of portions of a system that includes one or more processors coupled to a main memory and a USB host controller, according to some embodiments.

In some embodiments, a USB system may be adapted to implement hardware-assisted endpoint idleness detection. FIG. 2 is a schematic illustration of portions of a system that includes one or more processors coupled to a main memory and a USB host controller, according to some embodiments. Referring to FIG. 2, a system 200 includes one or more processors 270 coupled to a main memory 230 and a USB host controller 205. An asynchronous schedule 240 is stored in the main memory 230. The USB host controller 205 includes a deferring policy engine 275 to implement policies for deferring traffic to and from USB host controller 205. The processor or processors 270 may change the asynchronous schedule 240.

One way to limit the use of the asynchronous transfer schedule 240 stored in memory 230 is to reduce the aggressive polling by a USB host controller 205 of those endpoints that NAK frequently or for long periods of time. This reduces the number of accesses to the schedule 240 in memory 230. The polling can be reduced by placing USB ports 210 in a sleep mode to reduce polling of the USB device 225. A remote device wakeup can then be used to indicate that an endpoint is ready for servicing, instead of constantly polling the USB device 225 to determine when the endpoint is ready.

In some embodiments, the USB host controller 205 is configured to limit usage of an asynchronous schedule 240 stored in the memory 230 or the local memory buffer 255 by maintaining one or more USB ports 210 in a sleep state or a low-power link state until detecting some asynchronous notification initiated by a USB device 225 that it is ready for service of an asynchronous transfer endpoint. In some embodiments, the asynchronous notification includes a wake event, such as a resume-signaling indication (a remote wakeup) or a link state transition (e.g., L1 to L0), initiated by the USB device 225. This allows the USB host controller 205 to defer processing asynchronous transfers indefinitely while a USB device 225 is not ready to either provide or consume data. This leads to a more intelligent polling scheme than the power-inefficient polling of a typical USB implementation.

The policy and protocol for placing a port in sleep mode may be specific to a USB implementation. Placing a USB port 210 in a sleep mode may include an exchange of protocol signals between the USB device 225 and the USB host controller 205. For example, the USB host controller 205 transmits a request to a USB device 225 to place the corresponding USB port 210 in a sleep mode and the USB device 225 acknowledges the request with an ACK response.

In some embodiments, the USB host controller 205 places a USB port 210 in a sleep mode after a predetermined number of not ready responses, such as a NAK response packet, are returned by a corresponding USB device 225 for a bulk-IN transfer. In some embodiments, the USB host controller 205 places a USB port 210 in a sleep mode for a bulk-OUT transfer only after a not ready response, such as a NYET response packet, is returned by a corresponding USB device 225 for the transfer. In some embodiments, the USB host controller 205 attempts to place a USB port 210 in a sleep mode each time a transfer descriptor 265 is completed.

In some embodiments, USB devices 225 are allowed to respond with a not ready (NAK) response when the USB host controller 205 attempts to place a corresponding USB port 210 in a sleep mode. Placing a USB port 210 in a sleep mode typically includes a protocol exchange to place a port in a sleep mode, a minimum amount of time that a port is required to stay in sleep mode, and time to transition out of the sleep mode. This protocol exchange adds a delay that could cause a buffer to overflow. For example, a USB device 225 may include a wireless network adapter connected at a very high rate. If the USB device 225 is receiving data at a very high data rate and its receive buffer is nearly full, the USB device 225 will almost immediately be ready to send the data for a bulk-IN transfer to the USB port 210. The delay from the protocol overhead involved with placing a device in sleep mode, and transitioning out of sleep mode, could cause the buffer on the USB device 225 to overflow and in this case the bus protocol may allow the USB device 225 to deny (e.g., NAK) the request to place the USB port 210 in sleep mode if one or more asynchronous bulk-IN transfers are pending or will be immediately pending for an endpoint of the USB device 225. In some embodiments, the USB host controller 205 attempts to place a USB port 210 in a sleep mode periodically, such as by transmitting a request to place a USB port 210 in a sleep mode every millisecond for example.

In some bus implementations, a USB device 225 that does not support a sleep mode may be connected to a USB port 210. Such a device may be of an older type and is sometimes referred to as a legacy device. In some embodiments, the local memory buffer 255 of the USB host controller 205 of FIG. 2 includes a field for storing an indication of whether a connected USB device 225 supports a sleep mode. This allows the USB host controller 205 to manage the USB device 225 without having to access memory 230 or without having to poll the USB device 225 to determine whether the device supports sleep mode.

In some embodiments, the USB host controller 205 implements an extended QH structure to support three software-programmable but hardware-managed fields to streamline endpoint idleness detection. One embodiment of an extended QH structure is depicted in Table 1, and Tables 2-3 describe an implementation of an extension to the existing USB 2.0/EHCI 1.0 Queue Head (QH) structure.

TABLE 1

Queue Head Structure Extensions for Endpoint Idleness

| 31 30 29 28 27 26 25 24 23 22 21 20 19 18 17 16 15 14 13 12 11 10 9 8 7 6 5 4 3 2 1 0 | | |
|---|---|---|
| Queue Head Horizontal List Pointer    0   Typ   T | | 0 |
| RL   C   Maximum Packet Length   H dtc EPS   EndPt   I   Device Address | | 1 |
| Mult   Port Number   Hub Address   uFrame C-Mask   uFrame S-Mask | | 2 |
| Current qTD Pointer    0 | | 3 |
| Next qTD Pointer    0   T | | 4 |
| Alternate Next qTD Pointer    NakCnt   T | | 5 |
| dt   Total Bytes to Transfer   loc Cpage   Cerr   PID Code   Status | | 6 |
| Buffer Pointer (Page 0) | Current Offset | 7 |
| Buffer Pointer (Page 1) | Reserved   C-prog-mask | 8 |
| Buffer Pointer (Page 2) | S-bytes   Frame Tag | 9 |
| Buffer Pointer (Page 3) | Idleness Count (IC)   IT   lol | 10 |
| Buffer Pointer (Page 4) | Reserved | 11 |

TABLE 2

Queue Head (DWORD 10) Extensions for Endpoint Idleness Detection

| Bit | Description |
|---|---|
| 11:4 | Idleness Count (IC) - R/W. This field is a counter the host controller decrements whenever the associated endpoint has not successfully transferred data during an entire microframe. Software must apply a non-zero value to this field prior to activating the QH when idleness detection is enabled (non-zero Idleness Threshold). Hardware will automatically reload this counter using the current value of Idleness Threshold whenever execution of this transaction completes with a response other than NAK. Once the value decrements to zero it will remain there until the endpoint returns a non-NAK response or software alters this value. Software should only modify this field when the associated QH is inactive. |
| 3:1 | Idleness Threshold (IT) - R/W. Used by software to specify the number of microframes that an endpoint must constantly NAK before being considered 'idle'.<br>000b Disabled [default value]<br>001b 2 microframes<br>010b 4 microframes<br>011b 8 microframes (1 frame)<br>100b 16 microframes (2 frames)<br>101b 32 microframes (4 frames)<br>110b 64 microframes (8 frames)<br>111b 128 microframes (16 frames)<br>Software should only modify this field when the associated QH is inactive. |

TABLE 2-continued

Queue Head (DWORD 10) Extensions for Endpoint Idleness Detection

| Bit | Description |
|---|---|
| 0 | Interrupt on Idle (ioi) - R/W. If this bit is set to one and Idleness Threshold is enabled (non-zero value), the host controller will issue an interrupt at the next interrupt threshold whenever Idleness Count decrements to zero. Note the host controller will not generate successive interrupts while Idleness Count remains zero; a new idleness interrupt will only be generated after Idleness Count is reloaded and once again decrements to zero. |

TABLE 3

HCCPARAMS Extensions for Endpoint Idleness Detection

| Bit | Description |
|---|---|
| 18 | Endpoint Idleness Detection Capability. Default = Implementation dependent. If this bit is set to one the host controller supports the endpoint idleness detection capability and associated fields as defined in DWORD 10 of the Queue Head structure, specifically Idleness Threshold (bits 3:0) and Idleness Count (bits 11:4). Note that software is prohibited from using these fields unless this bit is set (1). |

Figure 3:
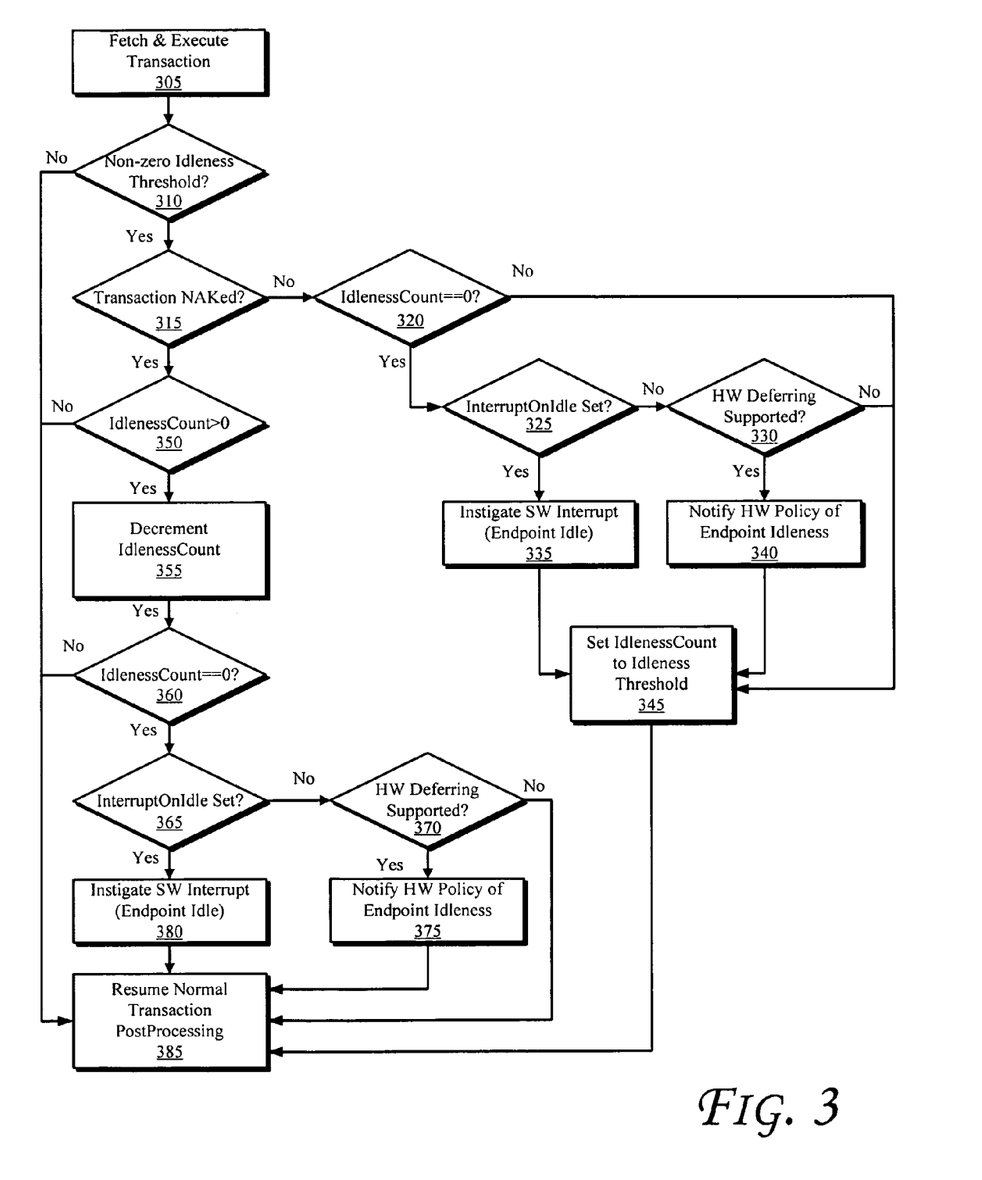
FIG. 3 is a flowchart illustrating operations in a method to implement hardware assisted endpoint idleness detection, according to some embodiments.

FIG. 3 is a flowchart illustrating operations in a method to implement hardware assisted endpoint idleness detection, according to some embodiments. In some embodiments, the operations depicted in FIG. 3 may be implemented by one or more components in a USB host controller such as, e.g. a deferring policy engine 275. Referring to FIG. 3, operation 305 a transaction is first fetched and then executed. At operation 310 the deferring policy engine checks the idleness threshold in place, for example by referring to the idealists threshold parameter in the extended QH structure depicted in Table 1. If, at operation 310 a non-zero idleness threshold is not in place, then control passes to operation 385 and normal transaction postprocessing may be continued.

By contrast, if, at operation 310 a nonzero idleness threshold is in place, then control passes to operation 315, and the deferring policy engine 275 determines whether the transaction has NAKed. If the transaction has NAKed, then control passes to operation 320 and the deferring policy engine 275 evaluates whether the IdlenessCount is zero. If the Idleness-Count is non-zero, then control passes to operation 345 and the deferring policy engine 275 sets the IdlenessCount to the Idleness Threshold. Control then passes to operation 385 and normal transaction postprocessing may be continued.

By contrast, if at operation 320 the IdlenessCount is not equal to zero, then control passes to operation 325 and the deferring policy engine 275 evaluates whether the InterruptOnIdle parameter is set. In one embodiment, InterruptOnIdle (ioi) is a mechanism by which SW indicates whether SW or HW deferring should be employed. Other techniques may be used. If the InterruptOnIdle parameter is not set, then control passes to operation 330 and the deferring policy engine 275 evaluates whether hardware deferring of traffic to and from the USB host controller is supported. If hardware deferring is not supported, then control passes to operation 345 and the deferring policy engine 275 sets the IdlenessCount to the Idleness Threshold. Control then passes to operation 385 and normal transaction postprocessing may be continued. By contrast, if at operation 325 the InterruptOnIdle flag is set, then control passes to operation 335 and the deferring policy engine 275 instigates a software interrupt. Control then passes to operation 345 and the deferring policy engine 275 sets the IdlenessCount to the Idleness Threshold. Control then passes to operation 385 and normal transaction postprocessing may be continued.

Referring back to operation 315, if the transaction has not NAKed, the control passes to operation 350 and the deferring policy engine 275 evaluates whether the IdlenessCount parameter is greater than zero. If the parameter is not greater than zero, control then passes to operation 385 and normal transaction postprocessing may be continued. By contrast, if the parameter is greater than zero then control passes to operation 355 and the deferring policy engine 275 decrements the IdlenessCount parameter.

At operation 360 the deferring policy engine 275 evaluates whether the idleness Count parameter decremented in operation 355 is equal to zero. If the parameter is nonzero, then control passes to operation 385 and normal transaction postprocessing may be continued. By contrast, if the Idleness-Count parameter is zero then control passes to operation 365 and the deferring policy engine 275 evaluates whether the InterruptOnIdle flag is set. If the flag is not set, then control passes to operation 370 and the deferring policy engine 275 determines whether hardware deferring is supported. If hardware deferring is not supported, then control passes to operation 385 and normal transaction postprocessing may be continued. By contrast, if hardware deferring is supported then control passes to operation 375 and the deferring policy engine 275 notifies hardware policy of endpoint idleness. Control then passes to operation 385 and normal transaction postprocessing may be continued. Referring back to operation 365, if the InterruptOnIdle flag is set, then control passes to operation 380 and a software interrupt is instigated. Control then passes to operation 385 and normal transaction postprocessing may be continued.

Figure 4:
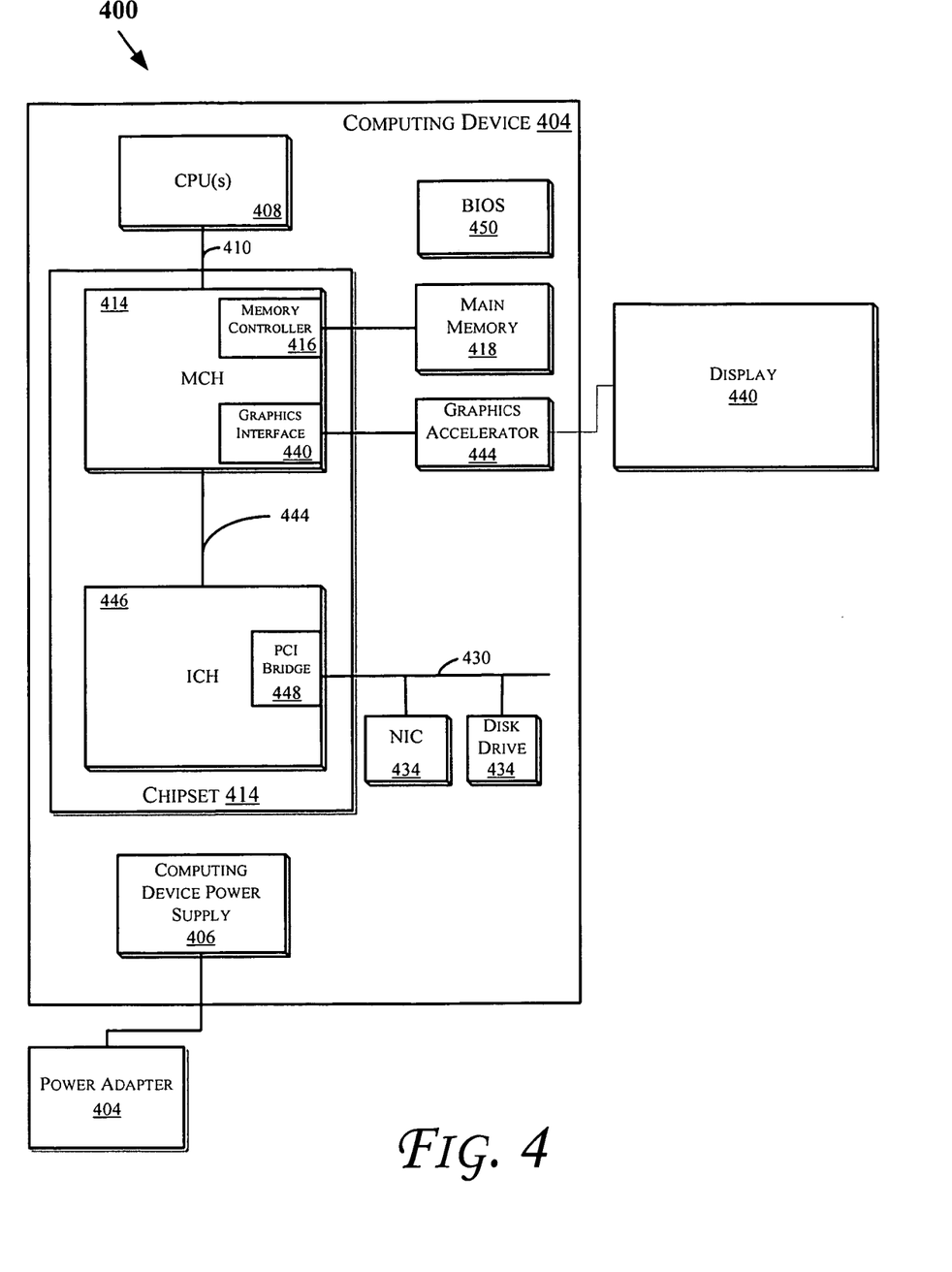
FIG. 4 is a schematic illustration of a computer system, in accordance with some embodiments.

FIG. 4 is a schematic illustration of an architecture of a computer system which may include a USB interface 100 in accordance with some embodiments. Computer system 400 includes a computing device 402 and a power adapter 404 (e.g., to supply electrical power to the computing device 402). The computing device 402 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 402 (e.g., through a computing device power supply 406) from one or more of the following sources: one or more battery packs, an alternating current (AC) outlet (e.g., through a transformer and/or adaptor such as a power adapter 404), automotive power supplies, airplane power supplies, and the like. In one embodiment, the power adapter 404 may transform the power supply source output (e.g., the AC outlet voltage of about 110VAC to 240VAC) to a direct current (DC) voltage ranging between about 7VDC to 12.6VDC. Accordingly, the power adapter 404 may be an AC/DC adapter.

The computing device 402 may also include one or more central processing unit(s) (CPUs) 408 coupled to a bus 410. In one embodiment, the CPU 408 may be one or more processors in the Pentium® family of processors including the Pentium® II processor family, Pentium® III processors, Pentium® IV processors, Core and Core2 procesors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 412 may be coupled to the bus 410. The chipset 412 may include a memory control hub (MCH) 414. The MCH 414 may include a memory controller 416 that is coupled to a main system memory 418. The main system memory 418 stores data and sequences of instructions that are executed by the CPU 408, or any other device included in the system 400. In some embodiments, the main system memory 418 includes random access memory (RAM); however, the main system memory 418 may be implemented using other memory types such as dynamic RAM (DRAM), synchronous DRAM (SDRAM), and the like. Additional devices may also be coupled to the bus 410, such as multiple CPUs and/or multiple system memories.

In some embodiments, main memory 418 may include a one or more flash memory devices. For example, main memory 418 may include either NAND or NOR flash memory devices, which may provide hundreds of megabytes, or even many gigabytes of storage capacity.

The MCH 414 may also include a graphics interface 420 coupled to a graphics accelerator 422. In one embodiment, the graphics interface 420 is coupled to the graphics accelerator 422 via an accelerated graphics port (AGP). In an embodiment, a display (such as a flat panel display) 440 may be coupled to the graphics interface 420 through, for example, a signal converter that translates a digital representation of an image stored in a storage device such as video memory or system memory into display signals that are interpreted and displayed by the display. The display 440 signals produced by the display device may pass through various control devices before being interpreted by and subsequently displayed on the display.

A hub interface 424 couples the MCH 414 to an input/output control hub (ICH) 426. The ICH 426 provides an interface to input/output (I/O) devices coupled to the computer system 400. The ICH 426 may be coupled to a peripheral component interconnect (PCI) bus. Hence, the ICH 426 includes a PCI bridge 428 that provides an interface to a PCI bus 430. The PCI bridge 428 provides a data path between the CPU 408 and peripheral devices. Additionally, other types of I/O interconnect topologies may be utilized such as the PCI Express™ architecture, available through Intel® Corporation of Santa Clara, Calif.

The PCI bus 430 may be coupled to a network interface card (NIC) 432 and one or more disk drive(s) 434. Other devices may be coupled to the PCI bus 430. In addition, the CPU 408 and the MCH 414 may be combined to form a single chip. Furthermore, the graphics accelerator 422 may be included within the MCH 414 in other embodiments.

Additionally, other peripherals coupled to the ICH 426 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like.

System 400 may further include a basic input/output system (BIOS) 450 to manage, among other things, the boot-up operations of computing system 400. BIOS 450 may be embodied as logic instructions encoded on a memory module such as, e.g., a flash memory module.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to implement idleness detection for an endpoint in a universal serial bus (USB) host controller, comprising:
    defining an idleness threshold parameter for the endpoint;
    setting an idleness count bit equal to the idleness threshold parameter when a transaction at the endpoint is completed; and
    decrementing the idleness count bit when a microframe passes without successful data transmission from the endpoint.

2. The method of claim 1, wherein a software module sets the idleness threshold to a non-zero value to indicate that idleness detection is active.

3. The method of claim 1, wherein the idleness threshold identifies a number of microframes that an endpoint must NAK before being considered idle.

4. The method of claim 1, further comprising instigating a software interrupt when an interrupt on idle flag is set and idleness detection is active.

5. The method of claim 1, further comprising resuming normal transaction postprocessing.

6. The method of claim 2, wherein the software module applies a value to the idleness count prior to activating a queue head.

7. An electronic apparatus, comprising:
    at least one memory module;
    a universal serial bus (USB) host controller coupled to the memory module, wherein the USB host controller implements hardware assisted idleness endpoint detection;
    define an idleness threshold parameter for the endpoint;
    set an idleness count bit equal to the idleness threshold parameter when a transaction at the endpoint is completed; and
    decrement the idleness count bit when a microframe passes without successful data transmission from the endpoint.

8. The electronic apparatus of claim 7, wherein the host controller comprises logic to set the idleness threshold to a non-zero value to indicate that idleness detection is active.

9. The electronic apparatus of claim 7, wherein the host controller comprises logic to apply a value to the idleness count prior to activating a queue head.

10. The electronic apparatus of claim 7, wherein the idleness threshold identifies a number of microframes that an endpoint must NAK before being considered idle.

11. The electronic apparatus of claim 7, wherein the host controller comprises logic to instigate a software interrupt when an interrupt on idle flag is set and idleness detection is active.

12. The electronic apparatus of claim 7, wherein the host controller comprises logic to resume normal transaction postprocessing.

* * * * *